United States Patent
Gupta et al.

(10) Patent No.: US 11,869,353 B2
(45) Date of Patent: Jan. 9, 2024

(54) VEHICULAR TOPPLE RISK NOTIFICATION

(71) Applicant: Toyota Motor Engineering & Manufacturing North America, Inc., Plano, TX (US)

(72) Inventors: Rohit Gupta, Santa Clara, CA (US); Ziran Wang, San Jose, CA (US); Yanbing Wang, Nashville, TN (US); Kyungtae Han, Palo Alto, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 155 days.

(21) Appl. No.: 17/385,012

(22) Filed: Jul. 26, 2021

(65) Prior Publication Data

US 2023/0029036 A1 Jan. 26, 2023

(51) Int. Cl.
*G08G 1/0967* (2006.01)
*G01C 21/36* (2006.01)
(Continued)

(52) U.S. Cl.
CPC ............ *G08G 1/0967* (2013.01); *B60Q 9/00* (2013.01); *G01C 21/3691* (2013.01); *G07C 5/008* (2013.01)

(58) Field of Classification Search
CPC .. G08G 1/0967; G08G 1/0112; G08G 1/0133; G08G 1/0141; G08G 1/048; G08G 1/096716; G08G 1/096775; B60Q 9/00; B60Q 9/008; G01C 21/3691; G07C 5/008; B60W 40/06; B60W 50/14; B60T 2230/03

See application file for complete search history.

(56) References Cited

U.S. PATENT DOCUMENTS 9,904,289 B1 * 2/2018 Hayward ............... G08G 1/127
2009/0301342 A1 12/2009 Morichika et al.
(Continued)

FOREIGN PATENT DOCUMENTS

| CN | 101441128 A | 5/2009 |
| CN | 104331611 A | 2/2015 |

(Continued)

OTHER PUBLICATIONS

YouTube Video, "High winds blow Amazon delivery truck off the road in Colorado," https://www.youtube.com/watch?v=P5woTiEGDtI, Jan. 2, 2020 (last downloaded Jul. 26, 2021).
(Continued)

*Primary Examiner* — Omeed Alizada
(74) *Attorney, Agent, or Firm* — Christopher G. Darrow; Darrow Mustafa PC

(57) ABSTRACT

Systems, methods, and other embodiments described herein relate to generating a notification about a risk of a target vehicle toppling over due to wind. In one embodiment, a method includes determining a wind force of the wind at a location of the target vehicle and determining one or more characteristics of the target vehicle. The method includes determining whether there is a risk of the target vehicle toppling over based on the wind force of the wind and the one or more characteristics of the target vehicle. The method includes generating a notification about the risk.

20 Claims, 7 Drawing Sheets

(51) Int. Cl.
  *B60Q 9/00*  (2006.01)
  *G07C 5/00*  (2006.01)

(56) References Cited

U.S. PATENT DOCUMENTS

| | | |
|---|---|---|
| 2018/0210447 A1* | 7/2018 | Myers .................. B60W 40/02 |
| 2019/0258251 A1 | 8/2019 | Ditty et al. |
| 2020/0284817 A1* | 9/2020 | Dumont .................. B61F 9/005 |
| 2021/0048310 A1 | 2/2021 | George |
| 2021/0221392 A1* | 7/2021 | Zhao ................. B60W 60/0025 |

FOREIGN PATENT DOCUMENTS

| | | |
|---|---|---|
| GB | 2559885 A | 8/2018 |
| JP | 5888931 B2 | 3/2016 |

OTHER PUBLICATIONS

The News Tribune Video, "Video shows semi blowing over on Utah highway. 45 were toppled, cops say," https://www.thenewstribune.com/news/nation-world/national/article245601740.html, Sep. 29, 2020 (last downloaded on Jul. 26, 2021).

\* cited by examiner

VEHICULAR TOPPLE RISK NOTIFICATION

TECHNICAL FIELD

The subject matter described herein relates, in general, to systems and methods for generating a notification about a risk of a target vehicle toppling over due to wind.

BACKGROUND

A vehicle may include one or more sensors that detect and relay information about the environment in which the vehicle is travelling. However, the vehicle may be impacted by an environment beyond the reach of the vehicle sensors. The vehicle may benefit from including information from an environment beyond the reach of its vehicle sensors in its decision-making process.

SUMMARY

In one embodiment, a system for generating a notification about a risk of a target vehicle toppling over due to wind is disclosed. The system includes one or more processors, and a memory in communication with the one or more processors. The memory stores an environment characteristic determination module including instructions that when executed by the one or more processors cause the one or more processors to determine a wind force of the wind at a location of the target vehicle. The memory stores a vehicle characteristic determination module including instructions that when executed by the one or more processors cause the one or more processors to determine one or more characteristics of the target vehicle. The memory stores a risk determination module including instructions that when executed by the one or more processors cause the one or more processors to determine whether there is a risk of the target vehicle toppling over based on the wind force of the wind and the one or more characteristics of the target vehicle. The memory stores a notification module including instructions that when executed by the one or more processors cause the one or more processors to generate a notification about the risk.

In another embodiment, a method for generating a notification about a risk of a target vehicle toppling over due to wind is disclosed. The method includes determining a wind force of the wind at a location of the target vehicle and determining one or more characteristics of the target vehicle. The method includes determining whether there is a risk of the target vehicle toppling over based on the wind force of the wind and the one or more characteristics of the target vehicle. The method includes generating a notification about the risk.

In another embodiment, a non-transitory computer-readable medium for generating a notification about a risk of a target vehicle toppling over due to wind and including instructions that when executed by one or more processors cause the one or more processors to perform one or more functions is disclosed. The instructions include instructions to determine a wind force of the wind at a location of the target vehicle, determine one or more characteristics of the target vehicle, determine whether there is a risk of the target vehicle toppling over based on the wind force of the wind and the one or more characteristics of the target vehicle, and generate a notification about the risk.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
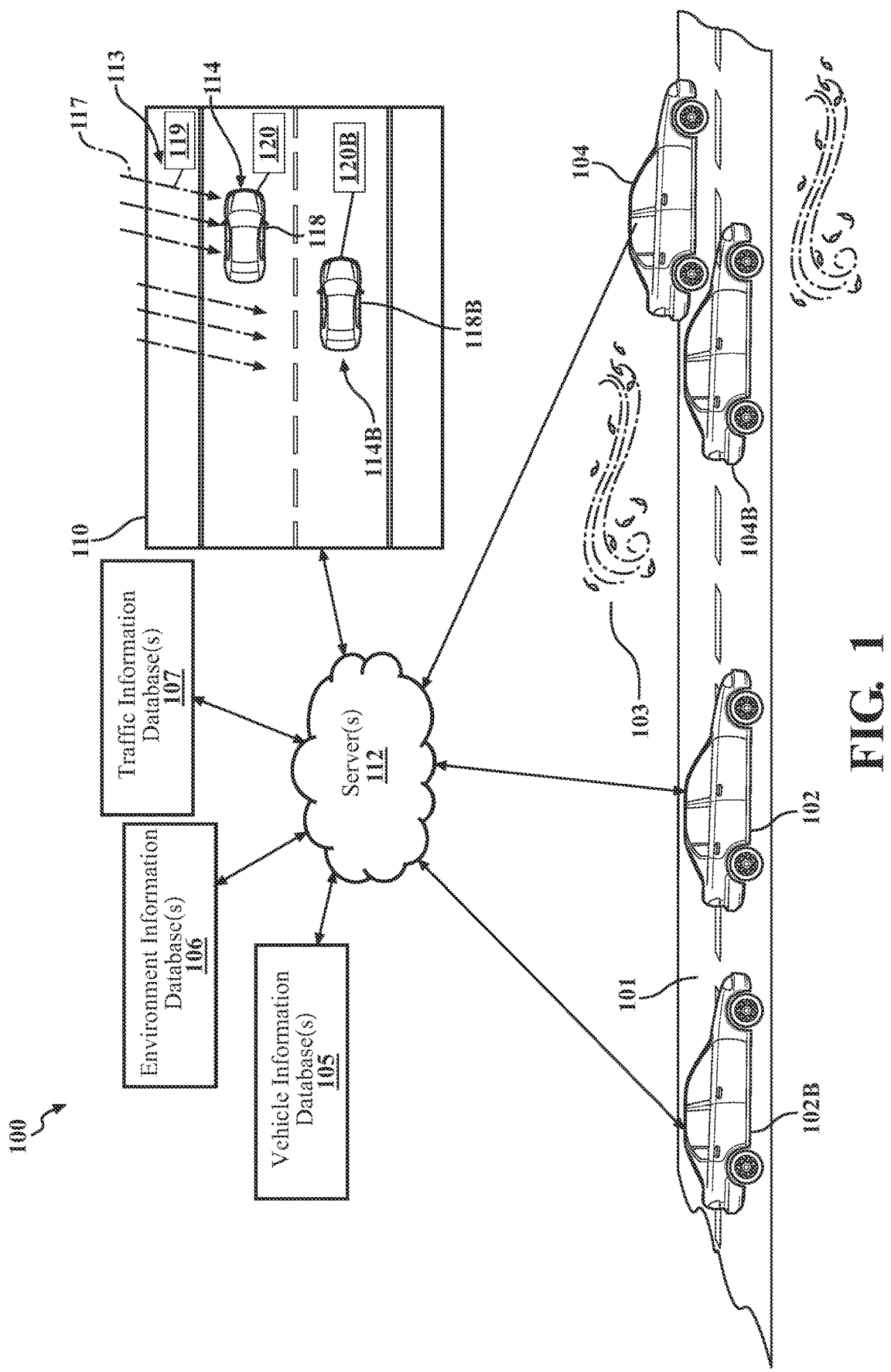
FIG. 1 is an example of a vehicle topple risk notification system.

Systems, methods, and other embodiments associated with generating a notification about a risk of a target vehicle toppling over due to wind is disclosed. A vehicle travelling on a route may be unable to determine that there is a portion of the route that may become inaccessible due to a target vehicle, proximate to the portion of the route, toppling over due to wind.

Accordingly, in one embodiment, the disclosed approach is a system that generates a notification about the risk of the target vehicle toppling over due to wind. As an example, the system may receive information about the environment from vehicle sensors and non-vehicle entities such as roadside servers, environment information database(s) and traffic information database(s). The information about the environment may include the presence of a wind, a wind speed, the wind force of the wind, the location of the target vehicle, the weather at the location, the traffic at the location, and the road conditions. The system may receive information about the target vehicle(s) and surrounding vehicle(s) from vehicle sensors and non-vehicle entities such as the roadside servers and vehicle information database(s). The information about the vehicle(s) may include the speed of the target vehicle(s) and the surrounding vehicle(s), dimensions of the target vehicle(s) and the surrounding vehicle(s), and aerodynamic forces acting the target vehicle(s).

The system may determine whether there is a risk that the target vehicle will topple over due to wind using any suitable algorithm. The system may determine a possibility of the target vehicle toppling over based on characteristics of the target vehicle such as the type of vehicle and the weight of the vehicle, and characteristics of the environment such as weather conditions which may be based on data from weather services, and road conditions which may be based on data from traffic information services. As an example, the system may be located in a cloud server, and may predict the possibility of the target vehicle toppling over based on data such as weather conditions from weather services, traffic conditions from traffic information services, and vehicle characteristics such as vehicle type, As an example, the system may apply a machine learning algorithm using a digital twin of the target vehicle as a machine learning model. In such an example, the system generate a virtual environment based on the environment surrounding the target vehicle. The system may generate a virtual rendition of the target vehicle, surrounding vehicles, and/or wind(s) in the virtual environment, where the positions and trajectories of the virtual renditions of the target vehicle, the surrounding vehicles, and winds mimic the positions and trajectories of the target vehicle, the surrounding vehicles and winds, respectively. The system may determine whether the target vehicle will topple over based on the positions and/or trajectory of the virtual renditions of the target vehicle, the surrounding vehicles and/or winds. Additionally and/or alternatively, the system may apply real-time and/or big data analytics based on the sensor data and the information from the various databases to determine whether there is a risk of the target vehicle toppling over due to wind. The data may be based on current information such as the current wind force of the wind and the current lift force of the target vehicle. The data may be based on predicted information such as a future wind force of the wind and a future lift force of target vehicle. The system may determine that there is a risk of the target vehicle toppling over in the case where the current wind force meets or exceeds the sum of the current lift force of the target vehicle and a safety factor or where the future wind force meets or exceeds the sum of the future lift force and the safety factor.

The system may be in a host vehicle and/or in a cloud server. The host vehicle may be any vehicle other than the target vehicle. The system may further determine the impact that the toppling of the target vehicle may have on the surrounding vehicle(s). The system may further determine an action for impacted vehicles to take such as taking an alternate route, slowing down, and/or parking.

In a case where the system predicts that the target vehicle will topple over, the system may generate a notification. The system may send the notification to the host vehicle, a surrounding vehicle, a second vehicle, and/or a non-vehicular entity like a cloud server or an information database. The notification may include information about the impact of the target vehicle toppling over, and an action that the impacted vehicle may take. As an example, the notification may include a warning to one or more other vehicles, indicating that the target vehicle may topple over. The notification may further include a suggestion to the other vehicle(s) to maintain a safe distance, avoid the road that the target vehicle is travelling on, and/or take an alternate route.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details.

Referring to FIG. 1, an example of a vehicle topple risk notification system 100 is shown. The vehicle topple risk notification system 100 may include various elements, which may be communicatively linked in any suitable form. As an example, the elements may be connected, as shown in FIG. 1. Some of the possible elements of the vehicle topple risk notification system 100 are shown in FIG. 1 and will now be described. It will be understood that it is not necessary for the vehicle topple risk notification system 100 to have all the elements shown in FIG. 1 or described herein. The vehicle topple risk notification system 100 may have any combination of the various elements shown in FIG. 1. Further, the vehicle topple risk notification system 100 may have additional elements to those shown in FIG. 1. In some arrangements, the vehicle topple risk notification system 100 may not include one or more of the elements shown in FIG. 1. Further, it will be understood that one or more of these elements may be physically separated by large distances.

The elements of the vehicle topple risk notification system 100 may be communicatively linked through one or more communication networks. As used herein, the term "communicatively linked" may include direct or indirect connections through a communication channel or pathway or another component or system. A "communication network" means one or more components designed to transmit and/or receive information from one source to another. The one or more of the elements of the vehicle topple risk notification system 100 may include and/or execute suitable communication software, which enables the various elements to communicate with each other through the communication network and perform the functions disclosed herein.

The one or more communication networks may be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further may be implemented as or include one or more wireless networks, whether short-range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long-range (e.g., a mobile, cellular, and/or satellite-based wireless network; GSM, TDMA, CDMA, WCDMA networks or the like). The communication network may include wired communication links and/or wireless communication links. The communication network may include any combination of the above networks and/or other types of networks.

The vehicle topple risk notification system 100 may include one or more connected host vehicles 102. As used herein, "vehicle" means any form of motorized transport. In one or more implementations, the vehicle may be an automobile. While arrangements will be described herein with respect to automobiles, it will be understood that embodiments are not limited to automobiles. In some implementations, the vehicle may be any device that, for example, transports passengers and includes the noted sensory devices from which the disclosed predictions and determinations may be generated. The vehicle may be any other type of vehicle that may be used on a roadway, such as a motorcycle. In some implementations, the vehicle may be a watercraft, an aircraft, or any other form of motorized transport. The host vehicle 102 may be a connected vehicle that is communicatively linked to one or more elements of the vehicle topple risk notification system 100.

The vehicle topple risk notification system 100 may include one or more entities that may exchange information with the host vehicle 102. The entities may include other vehicles such as target vehicle (s) 104 that are being monitored as they travel on a road 101 to determine whether they will topple over due to wind 103, surrounding vehicle(s) 104B that are proximate to the target vehicle (s) 104, and/or vehicles (also known as the second vehicles) 102B that are driving towards on or towards the road 101, and may be impacted by the target vehicle(s) 104. The entities may include roadside units and/or other information databases such as a vehicle information database 105, an environment information database 106, and a traffic information database 107.

The vehicle topple risk notification system 100 may include one or more servers 112. The server(s) 112 may be, for example, cloud-based server(s) or edge-based server(s). The server(s) 112 may communicate with one or more vehicles 102, 102B, 104, 104B over a communication module, such as by any type of vehicle-to-cloud (V2C) communications, now known or later developed. The server(s) 112 may receive data from and send data to the vehicle(s) 102, 102B. Alternatively and/or additionally, the server 112, the host vehicle 102 and the other vehicles 102B, 104, 104B may communicate over other suitable means such as vehicle-to-vehicle (V2V) communications and/or vehicle-to-everything (V2X) communications.

The vehicle topple risk notification system 100 may generate a virtual environment 110 with virtual renditions 114, 114B of vehicles 104, 104B in the environment. The virtual renditions 114, 114B of the vehicles 104, 104B may include virtual versions 118, 118B of the vehicles 104, 104B and metadata 120, 120B that includes information (such as speed and aerodynamic forces) relating to the vehicles 104, 104B. The vehicle topple risk notification system 100 may generate a virtual rendition 113 of wind 103 in the environment. The virtual rendition 113 of the wind 103 may include a virtual version 117 of the wind 103 and metadata 119 that includes information (such as the wind force and the direction) of the wind 103. The virtual environment 110 including the virtual renditions 114, 114B, 113 of the vehicles 104, 104B and the wind 103 in the environment may be displayed on a display interface visible to a vehicle operator.

Figure 2:
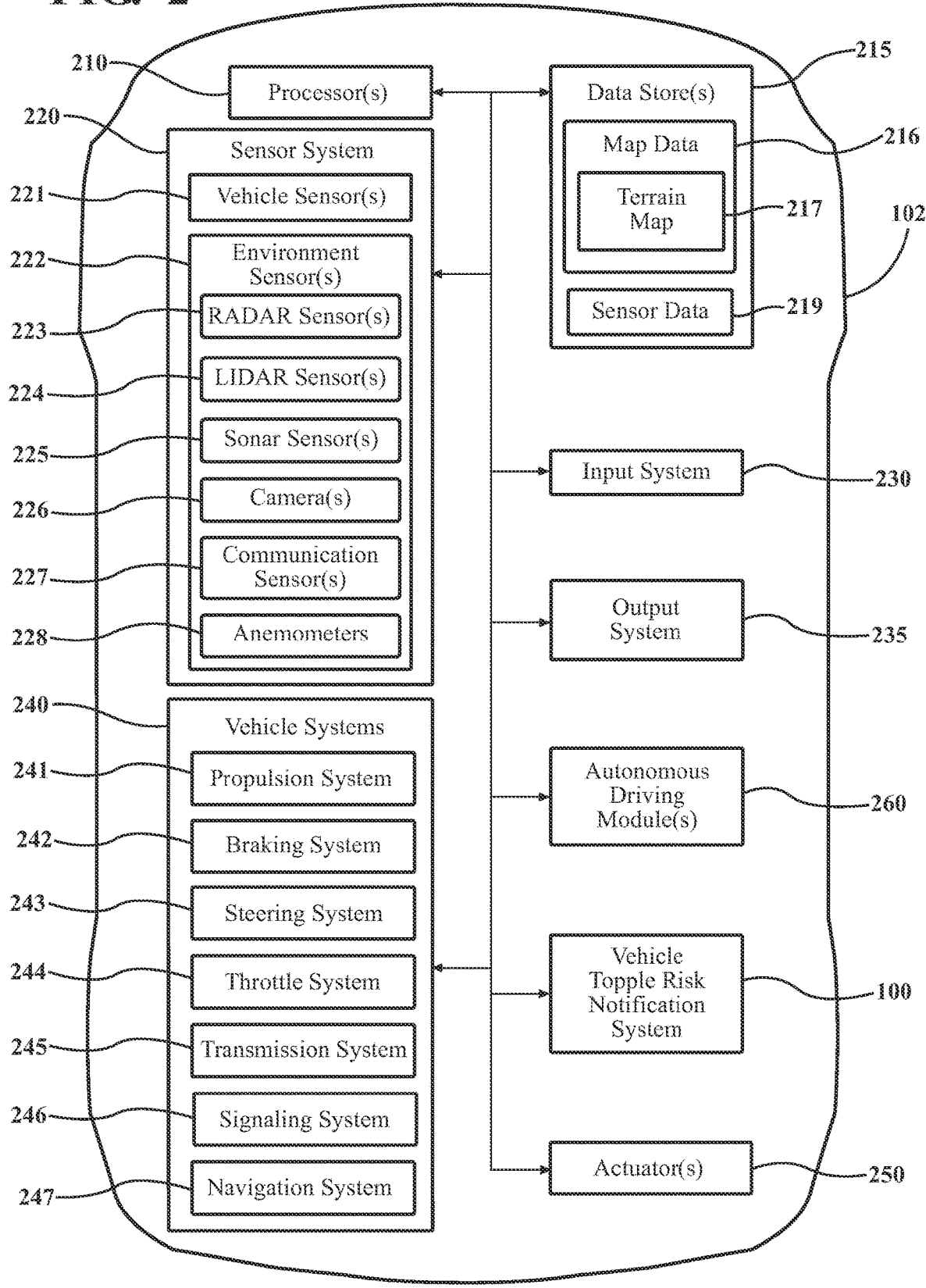
FIG. 2 illustrates a block diagram of a vehicle incorporating a vehicle topple risk notification system.

Referring to FIG. 2, a block diagram of the host vehicle 102 incorporating a vehicle topple risk notification system 100 is illustrated. The host vehicle 102 includes various elements. It will be understood that in various embodiments, it may not be necessary for the host vehicle 102 to have all of the elements shown in FIG. 2. The host vehicle 102 may have any combination of the various elements shown in FIG. 2. Further, the host vehicle 102 may have additional elements to those shown in FIG. 2. In some arrangements, the host vehicle 102 may be implemented without one or more of the elements shown in FIG. 2. While the various elements are shown as being located within the host vehicle 102 in FIG. 2, it will be understood that one or more of these elements may be located external to the host vehicle 102. Further, the elements shown may be physically separated by large distances. For example, as discussed, one or more components of the disclosed system may be implemented within a vehicle while further components of the system are implemented within a cloud-computing environment, as discussed further subsequently.

Some of the possible elements of the host vehicle 102 are shown in FIG. 2 and will be described along with subsequent figures. However, a description of many of the elements in FIG. 2 will be provided after the discussion of FIGS. 3-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 2, the host vehicle 102 includes a vehicle topple risk notification system 100 that is implemented to perform methods and other functions as disclosed herein relating to generating a notification about the risk of a target vehicle 104 toppling over due to wind. As will be discussed in greater detail subsequently, the vehicle topple risk notification system 100, in various embodiments, may be implemented partially within the host vehicle 102 and may further exchange communications with additional aspects of the vehicle topple risk notification system 100 that are remote from the host vehicle 102 in support of the disclosed functions. Thus, while FIG. 3 generally illustrates the vehicle topple risk notification system 100 as being self-contained, in various embodiments, the vehicle topple risk notification system 100 may be implemented within multiple separate devices some of which may be remote from the host vehicle 102.

Figure 3:
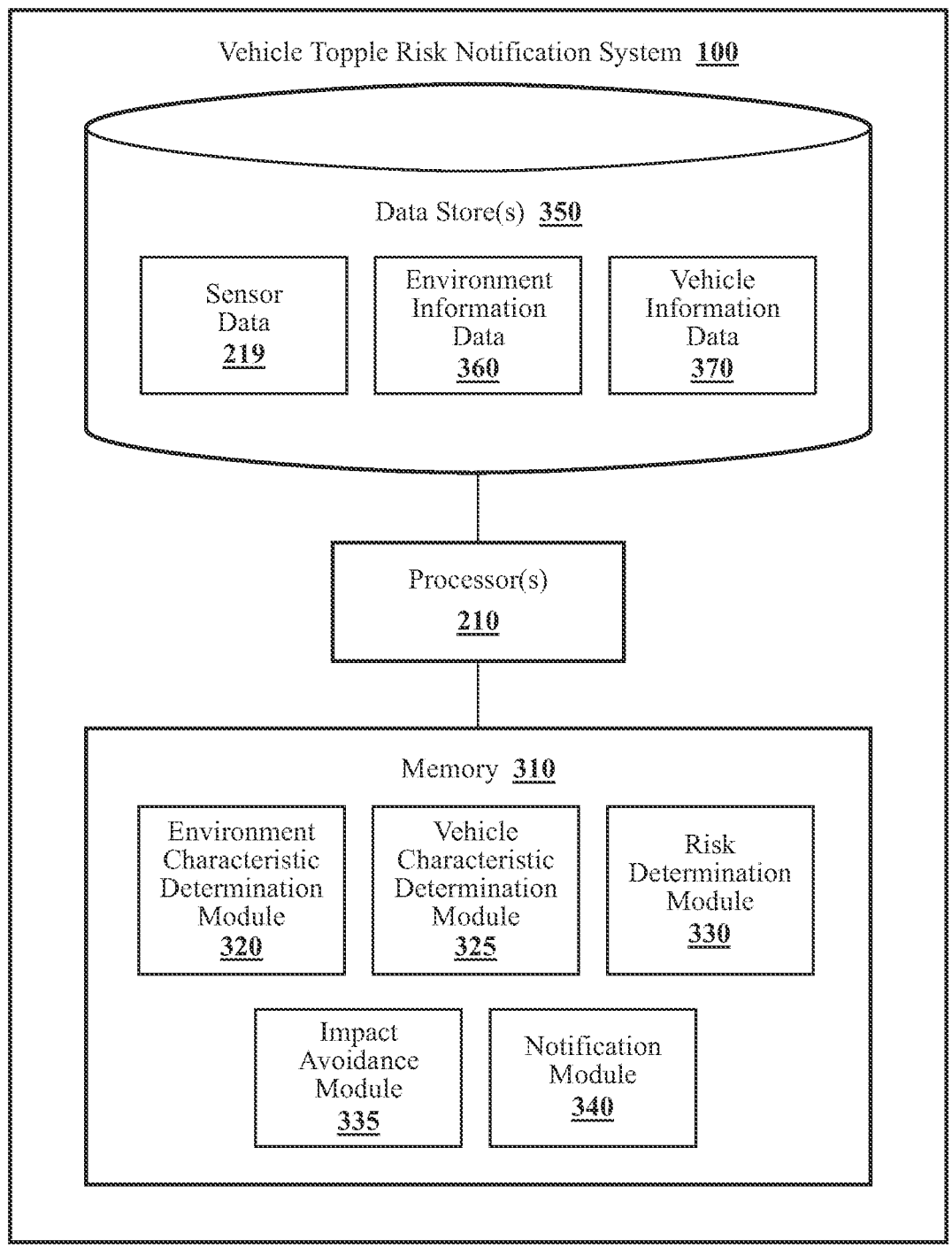
FIG. 3 illustrates one embodiment of the vehicle topple risk notification system of FIG. 2.

With reference to FIG. 3, one embodiment of the vehicle topple risk notification system 100 of FIG. 2 is further illustrated. The vehicle topple risk notification system 100 is shown as including a processor 210 from the host vehicle 102 of FIG. 2. Accordingly, the processor 210 may be a part of the vehicle topple risk notification system 100, the vehicle topple risk notification system 100 may include a separate processor from the processor 210 of the host vehicle 102, and/or the vehicle topple risk notification system 100 may access the processor 210 through a data bus or another communication path. In further aspects, the processor 210 is a cloud-based resource that communicates with the vehicle topple risk notification system 100 through a communication network. In one embodiment, the vehicle topple risk notification system 100 includes a memory 310 that stores an environment characteristic determination module 320, a vehicle characteristic determination module 325, a risk determination module 330, an impact avoidance module 335, and a notification module 340. The memory 310 is a random-access memory (RAM), read-only memory (ROM), a hard-disk drive, a flash memory, or other suitable memory for storing the modules 320, 325, 330, 335, and 340. The modules 320, 325, 330, 335, and 340 are, for example, computer-readable instructions within the physical memory 310 that when executed by the processor 210 cause the processor 210 to perform the various functions disclosed herein.

In one embodiment, the vehicle topple risk notification system 100 includes a data store 350. The data store 350 is, in one embodiment, an electronic data structure (e.g., a database) stored in the memory 310 or another data store and that is configured with routines that may be executed by the processor 210 for analyzing stored data, providing stored data, organizing stored data, and so on. Thus, in one embodiment, the data store 350 stores data used by the modules 320, 325, 330, 335, and 340 in executing various functions. In one embodiment, the data store 350 includes the sensor data 219 along with, for example, environment information data 360, vehicle information data 370, and or other information that is used by the modules 320, 325, 330, 335, and 340.

The sensor data 219 may originate from the sensor system 220 of the host vehicle 102. Additionally and/or alternatively, the sensor data 219 may originate from one or more external sources. The external sources may include any entities capable of wireless communication such as other vehicles including the target vehicle 104, the surrounding vehicle(s) 104B, roadside units, servers 112, and/or databases 105, 106, 107.

The sensor data 219 may include detected vehicles, detected wind, and/or physical characteristics in the environment surrounding the target vehicle 104. The sensor data 219 may further include metadata associated with the detected vehicles 102, 102B, 104, 104B, wind 103, and the physical characteristics of the environment. The associated metadata may indicate the type of the detected vehicle 102, 102B, 104, 104B (e.g., a truck, a sedan, a bus, a motorcycle, a bicycle), the type of weather conditions (e.g., wind speed, rain, etc.), and the type of road conditions (e.g., gradient level, friction level, etc.). The sensor data 219 may include traffic information such as traffic levels, a number of vehicles, the type of vehicle(s), the position of the vehicle(s) relative to each other, the speed of the vehicle(s), and/or the direction of travel of the vehicle(s). The sensor data 219 may include information about the position of the detected vehicle relative to the detecting sensor.

The metadata associated with the physical characteristics of the environment may include the location, the dimensions, and the condition of the road 101. The location of the road 101 may include geographic coordinates of the road 101 and the position of the road 101 relative to other roads. The dimensions of the road 101 may include the length of the road 101, the width of the road 101, the gradient level or slope of the road 101, the curvature of the road 101, and/or the friction level of the road 101. The condition of the road 101 may include information about the physical condition of the road 101 such as the presence of potholes, road debris, vegetation, occlusions, and/or the presence of road delineators such as lane markers, road edge markers, traffic signs, traffic lights, and communicative roadside units.

The sensor data 219 may include information about a weather condition in the environment. As an example, the sensor data 219 may include information about a detected wind 103 such as the wind speed, the wind force and/or the direction of the detected wind 103. The sensor data 219 may include information about precipitation such as snow, rain, and/or hail, and the impacts of the precipitation such as fallen snow levels and flooding. The sensor data 219 may include information about severe weather conditions such as a thunderstorm, a cyclone, and/or a tornado.

The environment information data 360 may include information about a weather condition, traffic, and/or a physical characteristic of the environment surrounding the target vehicle 104. The environment information data 360 may originate from one or more databases such as an environment information database 106 and/or a traffic information database 107.

The information about the weather condition may include a current and/or future weather condition of a location in the environment and the related geographic coordinates for the location in the environment. A weather condition may include, as an example, presence of a tornado, a cyclone, wind and/or precipitation such as snow, rain, and/or hail. The weather condition may include the wind speed, the wind force of wind, the direction of the wind, and/or the amount of precipitation that has fallen. The weather condition may further include impacts of weather such as fog levels, fallen snow levels (i.e. the amount of snow on the ground), and/or flooding. As previously mentioned, the weather condition may be based on the current weather condition and/or the future weather condition. The weather condition may be updated periodically and/or on-demand.

The information about the traffic may include information about the current and/or future traffic levels at the location. The information about the traffic may include the number of vehicles, the type of vehicle(s), the position of the vehicle(s) relative to each other, the speed of the vehicle(s), the direction of travel of the vehicle(s), and traffic rules based on the jurisdiction at the location. The information about traffic may be based on observed events and/or historical data.

The information about physical characteristics of the environment may include the location, the dimensions, and the condition of the road 101. The location of the road 101 may include geographic coordinates of the road 101 and the position of the road 101 relative to other roads. The dimensions of the road 101 may include the length of the road 101, the width of the road 101, the slope of the road 101, the curvature of the road 101, and/or the friction level of the road 101. The condition of the road 101 may include information about the physical condition of the road 101 such as the presence of potholes, road debris, vegetation, occlusions, and/or the presence of road delineators such as lane markers, road edge markers, traffic signs, traffic lights, and communicative roadside units.

In one embodiment, the environment characteristic determination module 320 includes instructions that function to control the processor 210 to determine a wind force of the wind 103 at a location of the target vehicle 104. The wind force of the wind 103 may include a current wind force of the wind 103 and/or a future wind force of the wind 103. As an example, the environment characteristic determination module 320 may receive the current wind force of the wind 103 and/or a future wind force of the wind 103 at the location of the target vehicle 104 from sensor data 219 and/or environment information data 360. As another example, the environment characteristic determination module 320 may receive the current wind speed and may determine the wind force of the wind 103 based on the wind speed using any suitable algorithm. In such an example, the environment characteristic determination module 320 may apply a formula such as:

$$F_w = A \times P \times C_d \times K_z \times G_h,$$

where $F_w$ is the wind force of the wind, A is a two dimensional surface area that the wind is hitting; P is wind pressure, which is based on the speed of the wind, $C_d$ is the drag coefficient, which is the force that air exerts on a vehicle, $K_z$ is the exposure coefficient, which is based on a vertical distance from the ground to a midpoint of the vehicle, and $G_h$ is the gust response factor, which is based on a vertical height of the vehicle.

The environment characteristic determination module 320 may retrieve the components of the formula from sensor data 219 and/or environment information data 360.

The environment characteristic determination module 320 may include instructions that function to control the processor 210 to determine a current and/or a future weather condition at the location of the target vehicle 104. As an example, the environment characteristic determination module 320 may receive weather information from sensor data 219 and/or environment information data 360.

The environment characteristic determination module 320 may include instructions that function to control the processor 210 to determine a traffic level at the location. As an example, the environment characteristic determination module 320 may receive traffic level from sensor data 219 and/or environment information data 360.

The environment characteristic determination module 320 may include instructions that function to control the processor 210 to determine a road characteristic at the location. As an example, the environment characteristic determination module 320 may receive a road characteristic from sensor data 219 and/or environment information data 360.

In one embodiment, the vehicle characteristic determination module 325 includes instructions that function to control the processor 210 to select one or more target vehicle 104s 104. The vehicle characteristic determination module 325 may select the target vehicle(s) 104 based on any suitable algorithm or criteria. As an example, the vehicle characteristic determination module 325 may select vehicles travelling through a defined region such as a section of a highway. In such an example, a geofence may be set up around the defined region and the vehicle(s) within the geofence are selected as target vehicle(s) 104. As another example, the vehicle characteristic determination module 325 may select the target vehicle(s) 104 based on their proximity to the host vehicle 102 and/or the second vehicle(s) 102B. The target vehicle(s) 104 may be within a predetermined radius (e.g., 0.5 mile, 1 mile) of the host vehicle 102 and/or the second vehicle(s) 104B. The target vehicle(s) 104 may be travelling ahead of, beside, behind the host vehicle 102 and/or the second vehicle(s) 102B. As an example, and in addition or as an alternative, the vehicle characteristic determination module 325 may select target vehicle(s) 104 based on vehicle size, vehicle speed, and/or vehicle configuration such as a vehicle with a trailer.

In one embodiment, the vehicle characteristic determination module 325 includes instructions that function to control the processor 210 to determine one or more characteristics of the target vehicle 104. The one or more characteristics of the target vehicle 104 may include one or more of a weight of the target vehicle 104, a dimension of the target vehicle 104, a center of gravity of the target vehicle 104, a speed of the target vehicle 104, and aerodynamic forces on the target vehicle 104. As an example, the vehicle characteristic determination module 325 may request and/or receive the characteristics of the target vehicle 104 from the target vehicle 104 using V2V communications. In such an example, the vehicle characteristic determination module 325 may request and/or receive the weight of the target vehicle 104, the dimension of the target vehicle 104, the center of gravity of the target vehicle 104, the speed of the target vehicle 104, and the aerodynamic forces on the target vehicle 104 from the target vehicle 104. As another example, the vehicle characteristic determination module 325 may receive sensor data 219 that includes information about the target vehicle 104 such as the characteristics of the target vehicle 104. As another example, the vehicle characteristic determination module 325 may receive sensor data 219 that includes an identifying feature of the target vehicle 104 such as a license plate, a vehicle brand, and/or vehicle model. In such an example, the vehicle characteristic determination module 325 may request and receive information about the target vehicle 104 from the vehicle information database 105 based on the identifying feature. The vehicle information database 105 may include information about vehicles. As an example, the vehicle information database 105 may include a vehicle license plate number, a vehicle brand name, a vehicle model name/number, the year of manufacture, a weight estimate, a dimension estimate, a center of gravity estimate, and aerodynamic forces.

In one embodiment, the risk determination module 330 includes instructions that function to control the processor 210 to determine whether there is a risk of the target vehicle 104 toppling over based on the wind force of the wind 103 at the location of the target vehicle 104 and the characteristic(s) of the target vehicle 104. As an example, the risk determination module 330 may determine the risk of the target vehicle 104 toppling over based on the traffic level at the location of the target vehicle 104, the wind force of the wind 103 at the location, and the characteristic(s) of the target vehicle 104. As another example, the risk determination module 330 may determine the risk of the target vehicle 104 toppling over based on the road characteristic(s), the wind force of the wind 103, and the characteristic(s) of the target vehicle 104. As another example, the risk determination module 330 may include instructions that function to control the processor 210 to determine an impact of the target vehicle 104 toppling over to an environment around the target vehicle 104.

The risk determination module 330 may apply any suitable model and/or algorithm to determine whether there is a risk of the target vehicle 104 toppling over. As an example, the risk determination module 330 may develop a digital twin model for the target vehicle 104. In such an example, the risk determination module 330 may generate a virtual environment 110 that includes a virtual rendition 114 of the target vehicle 104, a virtual rendition 114B of the surrounding vehicle(s) 104B, and a virtual rendition 113 of the wind 103 in the environment. As previously mentioned, the virtual renditions 114, 114B of the vehicles 104, 104B may include virtual versions 118, 118B of the vehicles 104, 104B and metadata 120, 120B that includes information (such as speed and aerodynamic forces) relating to the vehicles 104, 104B. The virtual rendition 113 of the wind 103 may include a virtual version 117 of the wind 103 and metadata 119 that includes information (such as the wind speed, the wind force and the direction) of the wind 103.

The risk determination module 330 may generate the virtual environment 110 based on the characteristics of the environment and/or the characteristics of the target vehicle 104. The characteristics of the environment, as previously mentioned, may include weather information, traffic information, and/or physical characteristics of the road 101. As an example, the risk determination module 330 may generate the virtual environment 110 by fusing together information received from the sensor data 219, the environment information data 360, and/or the vehicle information data 370. The risk determination module 330 may determine the position of the virtual version 118 of the target vehicle 104 within the virtual environment 110 based on the sensor data 219, the environment information data 360, and/or the vehicle information data 370. As an example, the risk determination module 330 may use any suitable algorithm such as a machine learning algorithm or an artificial intelligence process to determine the size of the virtual version 118 of the target vehicle 104 and the position of the virtual version 118 of the target vehicle 104 within the virtual environment. The risk determination module 330 may generate the virtual environment 110 in any suitable format such as a graphical format, a text format and/or a tabulated format. The risk determination module 330 may output the virtual environment 110 to a display interface in the host vehicle 102.

Figure 5:
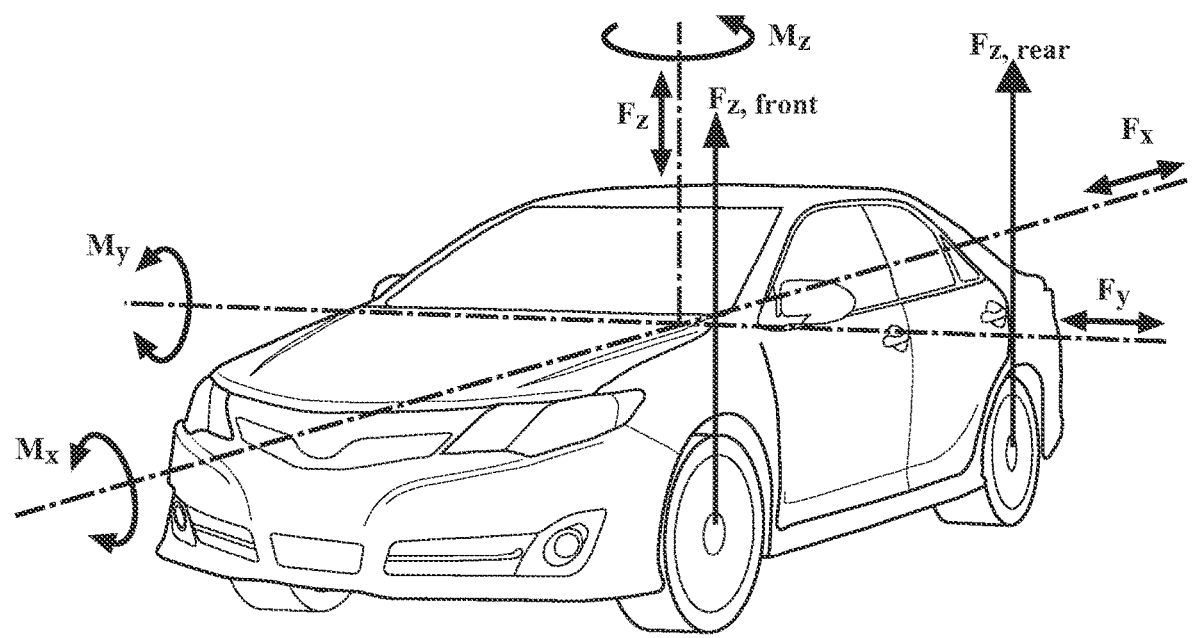
FIG. 5 illustrates a diagram of aerodynamic forces that act on a vehicle.

The risk determination module 330 may determine the risk of the target vehicle 104 toppling over using an algorithm such as the toppling algorithm described FIG. 5. As an example, the risk determination module 330 may determine whether there is a risk of the virtual rendition of the target vehicle 104 toppling over. In such an example, the risk determination module 330 may apply the toppling algorithm to the parameters of the digital twin model, e.g., the virtual rendition of the target vehicle 104, and the virtual environment. As another example, the risk determination module 330 may determine whether there is a risk of the target vehicle 104 toppling over by applying the toppling algorithm to the vehicle characteristics and the environment characteristics. In other words, the risk determination module 330 may determine the possibility of the target vehicle 104 toppling over based on vehicle characteristics such as the type of vehicle, and environment characteristics such as weather conditions, and road conditions. The risk determination module 330 may apply real-time and/or big data analytics to identify a hazardous condition such as a tornado, a cyclone, and/or a high wind, and to determine whether there is a risk of the target vehicle 104 toppling over based on the identified hazardous condition.

The risk determination module 330 may include instructions that function to control the processor 210 to determine an impact of the target vehicle 104 toppling over to the environment around the target vehicle 104. The risk determination module 330 may determine whether there is a risk of the target vehicle 104 toppling over, and in that case, the impact on surrounding vehicles 104B based on various factors such as the trajectory at which the target vehicle 104 toppled over, speed of travel of the target vehicle 104 and the surrounding vehicles 104B, size of the target vehicle 104 and the surrounding vehicles 104B, proximity of the target vehicle 104 and surrounding vehicles 104B, weather conditions, traffic conditions, and time of day. As an example, the risk determination module 330 may generate and include virtual renditions 114B of the surrounding vehicle(s) 104B in the virtual environment 110. The risk determination module 330 may monitor virtual renditions 114, 114B of the target vehicle 104 and the surrounding vehicles to determine the trajectory of the virtual renditions 114, 114B of target vehicle 104 and the surrounding vehicles 104B. As an example, the risk determination module 330 may determine the trajectory of the target vehicle 104 and the surrounding vehicles 104B based on the present and past positions of the virtual renditions 114, 114B of the target vehicle 104 and the surrounding vehicles 104B in the virtual environment 110, respectively. The risk determination module 330 may extrapolate the trajectories to determine whether the extrapolated trajectories intersect with each other. In the case where the extrapolated trajectories intersect with each other, the risk determination module 330 may predict that the virtual rendition 114 of the target vehicle 104 will block the path of and/or collide with the virtual rendition 114B of the surrounding vehicle(s) 104B.

In one embodiment, the impact avoidance module 335 includes instructions that function to control the processor 210 to determine an alternate route for a second vehicle 102B to travel so as to avoid the impact of the target vehicle 104 toppling over. The second vehicle 102B may be one of the surrounding vehicles 104B and/or the host vehicle 102. Additionally and/or alternatively, the second vehicle 102B may be a vehicle travelling towards the environment surrounding the target vehicle 104. As an example and in a case that the second vehicle 102B has a predetermined route of travel, the impact avoidance module 335 may determine whether the route of the second vehicle 102B traverses the environment impacted by the target vehicle 104 toppling over. In such an example, the impact avoidance module 335 may overlay the route of the second vehicle 102B in the virtual environment to determine whether the route of the second vehicle 102B and the environment impacted by the target vehicle 104 toppling over overlap. In the case that the route and the environment overlap, the impact avoidance module 335 may use any suitable mapping algorithm to re-route the second vehicle 102B and determine the alternate route.

In one embodiment, the notification module 340 includes instructions that function to control the processor 210 to generate a notification about the risk. The notification module 340 may include instructions that function to control the processor 210 to send the notification to at least one of a second vehicle 102B and a server 112. The notification may include information about the impact and/or the alternate route for the second vehicle 102B so as to avoid the impact. As an example, the notification may include a warning to the second vehicle 102B, indicating that the target vehicle 104 may topple over. The notification may further include a suggestion to the second vehicle 102 to maintain a safe distance, avoid the road that the target vehicle is travelling on, and/or take the alternate route. The notification module 340 may generate the notification in any suitable format such as text, images, and audio. As an example, the notification module 340 may output at least one of a visual alert and an audible alert in the second vehicle 102B and/or the server 112. As an example, the visual alert may be displayed on a display interface in the second vehicle 102B that is visible to the second vehicle operator. As another example, the audible alert may be output on the vehicle speakers. The notification module 340 may send the notification to a server 112 and/or a database 105, 106, 107 using any suitable communication network.

Figure 4:
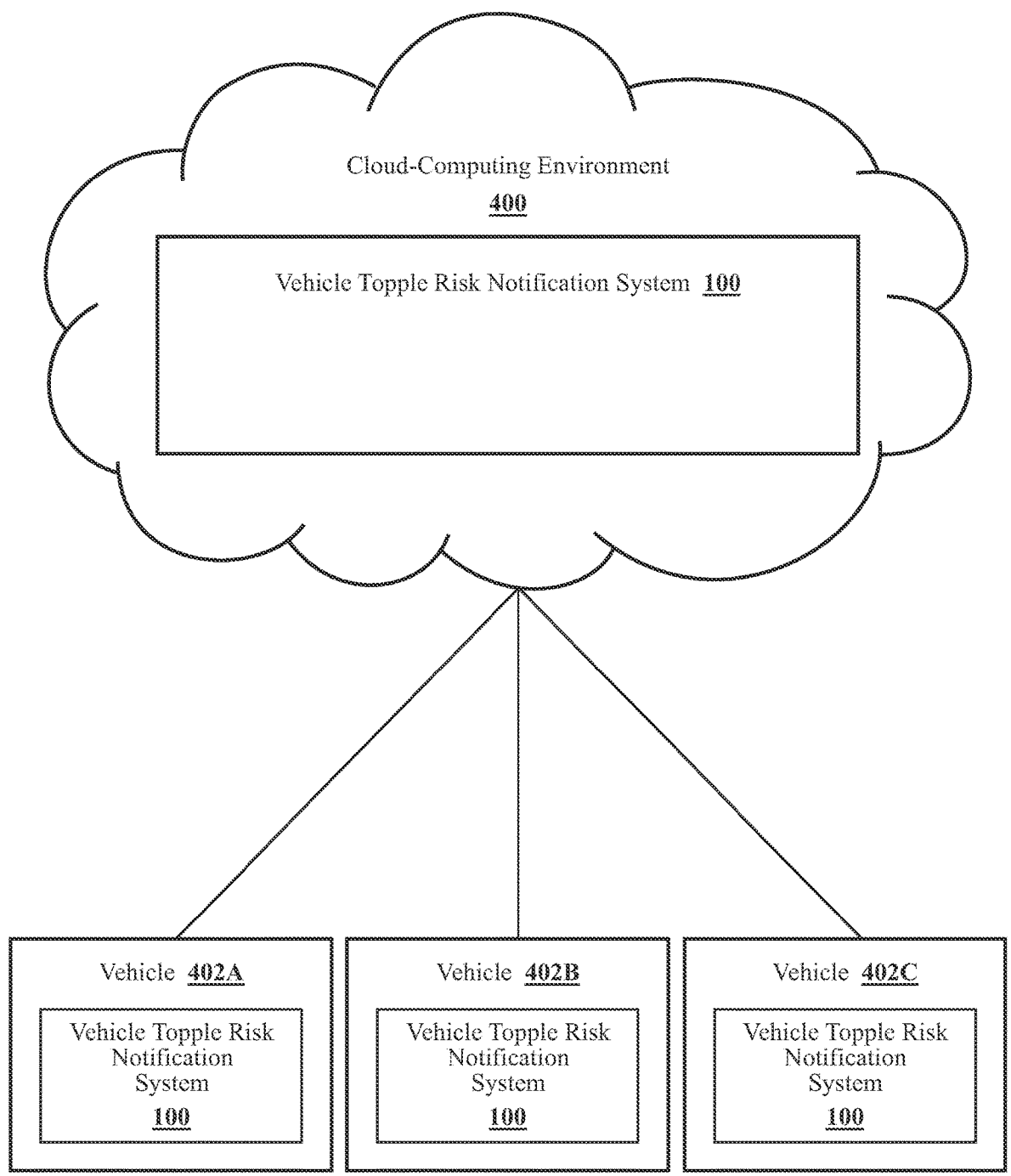
FIG. 4 illustrates a diagram of a vehicle topple risk notification system in a cloud-based configuration.

The vehicle topple risk notification system 100 may be further implemented as a cloud-based system that functions within a cloud-computing environment 400 as illustrated in relation to FIG. 4. That is, for example, the vehicle topple risk notification system 100 may acquire telematics data (i.e., sensor data 219) from vehicles, and environment information data 360 and/or vehicle information data 370 from external sources such as an external database. The vehicle topple risk notification system 100 may execute as a cloud-based resource that is comprised of devices (e.g., servers 112) remote from vehicles to generate a notification about a risk of a target vehicle 104 toppling over due to wind based on vehicle characteristics such as type of vehicle and environment characteristics such as weather conditions and road conditions. Accordingly, the vehicle topple risk notification system 100 may communicate with vehicles (e.g., vehicles 402A, 402B, and 402C) that are geographically distributed. In one approach, a cloud-based vehicle topple risk notification system 100 may collect the data 219, 360, 370 from components or separate instances of the vehicle topple risk notification system 100 that are integrated with the vehicles 402A, 402B, 402C.

Along with the communications, the vehicles 402A, 402B, 402C may provide sensor data 219. As such, the cloud-based aspects of the vehicle topple risk notification system 100 may then process the sensor data 219 separately for the vehicles 402A, 402B, 402C to generate the virtual environment 110, the virtual renditions 114, 114B of the target vehicle 104 and the surrounding vehicle(s) 104B. In further aspects, vehicle-based systems may perform part of the processing while the cloud-computing environment 400 may handle a remaining portion or function to validate results of the vehicle-based systems. It should be appreciated that apportionment of the processing between the vehicle 402A, 402B, 402C and the cloud may vary according to different implementations. Additional aspects of the cloud-computing environment 400 are discussed above in relation to components of the vehicle topple risk notification system 100 and FIG. 3.

FIG. 5. illustrates an example of a toppling algorithm for determining whether there is a risk of the target vehicle 104 toppling over. The aerodynamic forces on the target vehicle 104 are defined as:

$F_x$=Drag: Force along the longitudinal axis, opposite to vehicle movement $F_y$=Lateral force: Force along the transverse axis $F_{z,front}$=Lift$_{front}$: Force along the vertical axis at front wheel $F_{z,rear}$=Lift$_{rear}$: Force along the vertical axis at rear wheel $F_z$=Lift: Force along the vertical axis, $F_z=F_{z,front}+F_{z,rear}$ $M_x$=Roll: Rotation of the vehicle around the longitudinal axis $M_y$=Pitch: Rotation of the vehicle around the transverse axis $M_z$=Yaw: Rotation of the vehicle around the vertical axis As previously mentioned, an example of an algorithm for determining the wind force of the wind 103 is $F_w = A \times P \times C_d \times K_z \times G_h$, and the risk determination module 330 may receive the aerodynamic forces on the target vehicle 104 from the vehicle information database 107.

The risk determination module 330 may determine or receive the current wind force $F_w$, the future wind force $F_{wf}$, the current vehicle lift $F_z$, and the future wind force $F_{zf}$. The risk determination module 330 may determine a safety factor FS. The risk determination module 330 may apply one of the following formulae:

$$F_w >= F_z + FS$$

$$F_{wf} >= F_{zf} + FS$$

If the risk determination module 330 determines that one or both of the equations are true, then the risk determination module 330 determines that there is a risk that the target vehicle 104 will topple over. The risk determination module 330 may send a signal to the notification module 340 indicating that there is a risk that the target vehicle 104 will topple over. Additionally and/or alternatively, the risk determination module 330 may output a signal to the notification module 340 indicating that there is no risk that the target vehicle 104 will topple over when the risk determination module 330 determines that both equations are false and there is no risk of the target vehicle 104 toppling over.

Figure 6:
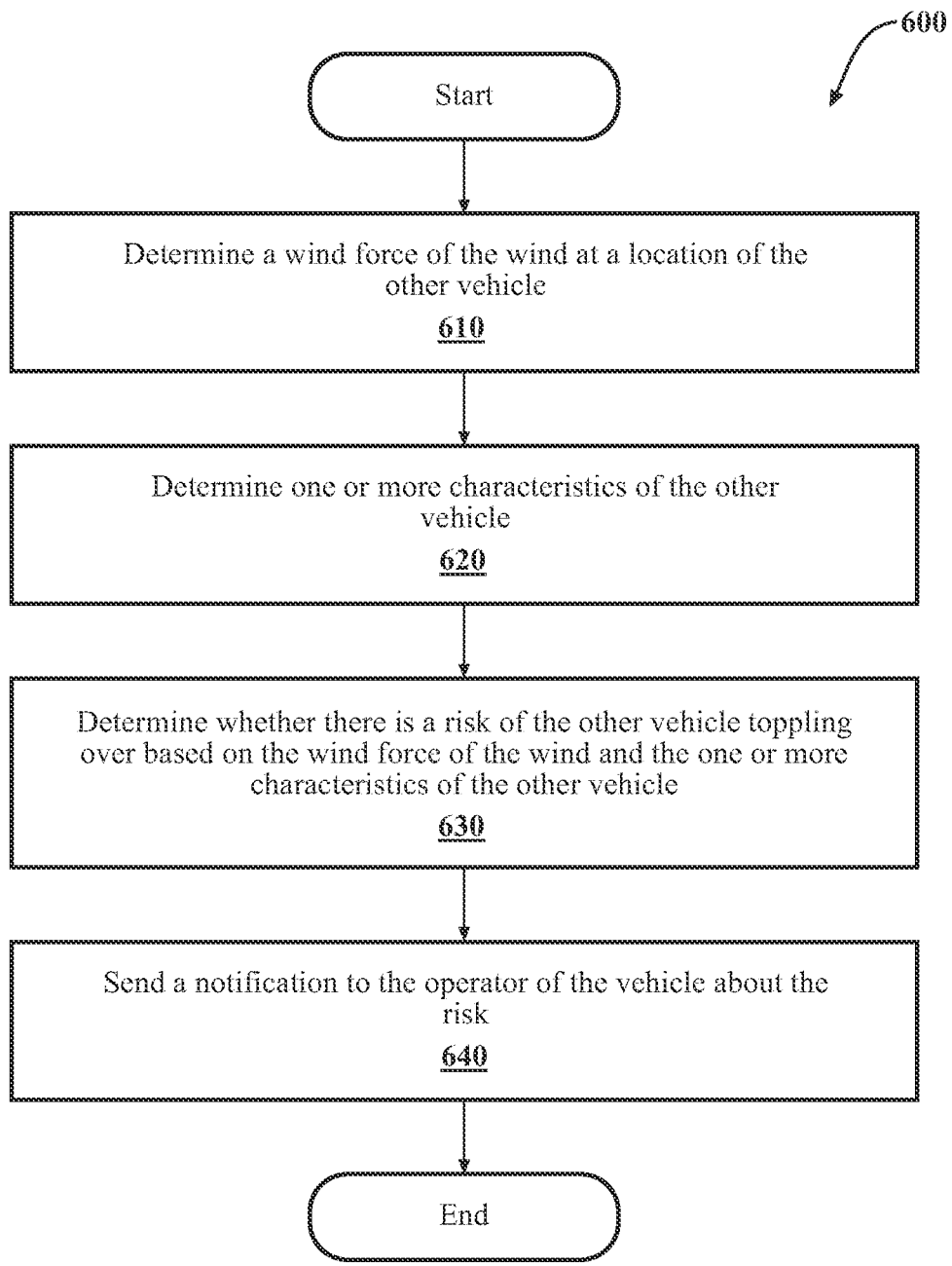
FIG. 6 is a flowchart illustrating one embodiment of a method associated with generating a notification about a risk of a target vehicle toppling over due to wind.

FIG. 6 illustrates a method 600 for generating a notification about a risk of a target vehicle 104 toppling over due to wind. The method 600 will be described from the viewpoint of the host vehicle 102 of FIG. 2 and the vehicle topple risk notification system 100 of FIG. 3. However, the method 600 may be adapted to be executed in any one of several different situations and not necessarily by the host vehicle 102 of FIG. 2 and/or the vehicle topple risk notification system 100 of FIG. 3.

At step 610, the vehicle topple risk notification system 100 may cause the processor(s) 210 to determine a wind force of the wind 103 at a location of the target vehicle 104. As an example, the environment characteristic determination module 320 may receive the wind speed and determine the wind force at the location. As previously mentioned, the environment characteristic determination module 320 may determine the current wind force and a future wind force.

At step 620, the vehicle topple risk notification system may cause the processor(s) 210 to determine the characteristic(s) of the target vehicle 104. As an example, the vehicle characteristic determination module 325 may determine the characteristics of the target vehicle 104. As previously mentioned, the vehicle characteristic determination module 325 may determine the dimensions of the target vehicle 104, and the aerodynamic forces applying to the target vehicle 104 such as a current lift force and/or a future lift force.

At step 630, the vehicle topple risk notification system 100 may cause the processor(s) 210 to determine whether there is a risk of the target vehicle 104 toppling over based on the wind force of the wind 103 and the characteristics of the target vehicle 104. As previously mentioned, the risk determination module 330 may determine the risk based on the current and future wind force of the wind 103 and the current and future lift force on the target vehicle 104. The risk determination module 330 may generate a virtual environment 110 and a virtual rendition of the target vehicle 104 based on sensor data 219, environment information data 360, and/or vehicle information data. The risk determination module 330 may determine the risk based on the virtual environment 110 and a virtual rendition of the target vehicle 104.

At step 640, the vehicle topple risk notification system may cause the processor(s) 210 to generate a notification about the risk. As previously mentioned, the notification module 340 may generate the notification about the risk and may send the notification to a second vehicle 102B and/or a non-vehicular entity like a server 112. The vehicle topple risk notification system 100 may cause the processor(s) 210 to determine the impact of the target vehicle 104 toppling over and/or an alternate route for a second vehicle 102B so that the second vehicle 102B may avoid the impact. The notification may include information about the impact and/or the alternate route.

Figure 7:
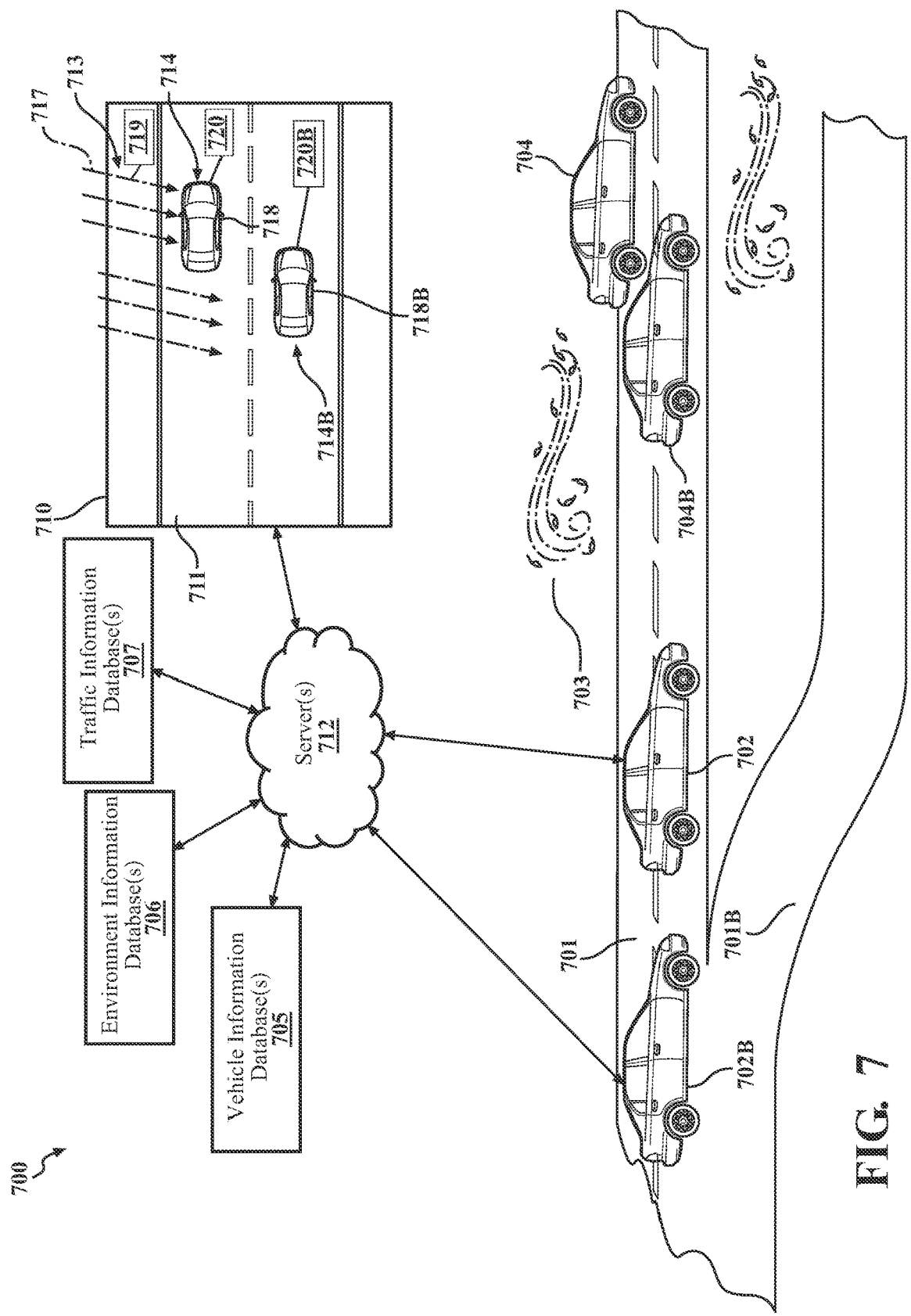
FIG. 7 is an example of a vehicle topple risk notification scenario.

A non-limiting example of the operation of the vehicle topple risk notification system 100 and/or one or more of the methods will now be described in relation to FIG. 7. FIG. 7 shows an example of a vehicle topple risk notification scenario.

In FIG. 7, the target vehicle 704, which is similar to the target vehicle 104, may be travelling on a two-lane road 701, a surrounding vehicle 704B is travelling proximate to the target vehicle 704. The host vehicle 702 and a second vehicle 702B are travelling behind the target vehicle 104 on the same road 701. The host vehicle 702 is connected to the vehicle information database 705, the environment information database 706, and the traffic information database 707 via the server 712.

The vehicle topple risk notification system 700, or more specifically, the environment characteristic determination module 320 may receive sensor data 219 from the sensor system 220 in the host vehicle 702 and environment information data 360 from an environment information database 706. The environment characteristic determination module 320 may determine the wind force of the wind 703 acting on the target vehicle 704.

The vehicle topple risk notification system 700, or more specifically, the vehicle characteristic determination module 325 may receive sensor data 219 from the sensor system 220 in the host vehicle 702, and vehicle information data 370 from a vehicle information database 705. The vehicle characteristic determination module 325 may determine the characteristics of the target vehicle 704 including the aerodynamic forces acting on the target vehicle 704.

The vehicle topple risk notification system 700, or more specifically, the risk determination module 330 may generate a virtual environment 710 that includes virtual renditions 714, 714B of the target vehicle 704 and the surrounding vehicle 704B. The virtual environment 710 may include virtual renditions 713, 711 of the wind 703 and the road 701. The virtual rendition 714 of the target vehicle 704 includes a virtual version 718 of the target vehicle 704 and related metadata 720. The virtual rendition 714B of the surrounding vehicle 704B includes a virtual version 718B of the surrounding vehicle 704B and related metadata 720B. The virtual rendition 713 of the wind 703 includes a virtual version 717 of the wind 703 and related metadata 719.

The vehicle topple risk notification system 700, or more specifically the risk determination module 330, may determine whether there is a risk of the target vehicle 704 toppling over based on the wind force $F_w$ of the wind and the lift force $F_z$ of the target vehicle 704. In this case and as an example, the risk determination module 330 may determine that $F_w >= F_z + FS$ is true and as such there is a risk of the target vehicle 704 toppling over. The risk determination module 330 may further determine whether the target vehicle 704 will collide with the surrounding vehicle 704B using the extrapolated trajectories of the virtual renditions of the target vehicle 704 toppling and the surrounding vehicle 704B.

The vehicle topple risk notification system 700, or more specifically the notification module 340, may generate a notification indicating that the target vehicle 704 is likely to topple over and collide with the surrounding vehicle 704B. The notification module 340 may send the notification to the second vehicle 702B. The impact avoidance module 335 may determine that the second vehicle 702B may travel on an alternate path 701B to avoid the toppling and collision of the target vehicle 704. The notification module 340 may send a notification that includes information about an alternate route. The notification module 340 may send the notification to a non-vehicle entity such as a traffic information database 707 that records traffic incidents.

FIG. 2 will now be discussed in full detail as an example environment within which the system and methods disclosed herein may operate. In some instances, the vehicle 102 (also known as the host vehicle) may be configured to switch selectively between an autonomous mode, one or more semi-autonomous operational modes, and/or a manual mode. Such switching may be implemented in a suitable manner, now known or later developed. "Manual mode" means that all of or a majority of the navigation and/or maneuvering of the vehicle is performed according to inputs received from a user (e.g., human driver). In one or more arrangements, the vehicle 102 may be a conventional vehicle that is configured to operate in only a manual mode. "Autonomous mode" refers to navigating and/or maneuvering the vehicle 102 along a travel route using one or more computing systems to control the vehicle 102 with minimal or no input from a human driver. In one embodiment, the vehicle 102 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 102 along a travel route.

The vehicle 102 may include one or more processors 210. In one or more arrangements, the processor(s) 210 may be a main processor of the vehicle 102. For instance, the processor(s) 210 may be an electronic control unit (ECU). The vehicle 102 may include one or more data stores 215 for storing one or more types of data. The data store 215 may include volatile and/or non-volatile memory. Examples of suitable data stores 215 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 215 may be a component of the processor(s) 210, or the data store 215 may be operatively connected to the processor(s) 210 for use thereby. The term "operatively connected," as used throughout this description, may include direct or indirect connections, including connections without direct physical contact.

In one or more arrangements, the one or more data stores 215 may include map data 216. The map data 216 may include maps of one or more geographic areas. In some instances, the map data 216 may include information or data on roads, traffic control devices, road markings, structures, features, and/or landmarks in the one or more geographic areas. The map data 216 may be in any suitable form. In some instances, the map data 216 may include aerial views of an area. In some instances, the map data 216 may include ground views of an area, including 360-degree ground views. The map data 216 may include measurements, dimensions, distances, and/or information for one or more items included in the map data 216 and/or relative to other items included in the map data 216. The map data 216 may include a digital map with information about road geometry. The map data 216 may be high quality and/or highly detailed.

In one or more arrangements, the map data 216 may include one or more terrain maps 217. The terrain map(s) 217 may include information about the ground, terrain, roads, surfaces, and/or other features of one or more geographic areas. The terrain map(s) 217 may include elevation data in the one or more geographic areas. The map data 216 may be high quality and/or highly detailed. The terrain map(s) 217 may define one or more ground surfaces, which may include paved roads, unpaved roads, land, and other things that define a ground surface.

The one or more data stores 215 may include sensor data 219. In this context, "sensor data" means any information about the sensors that the vehicle 102 is equipped with, including the capabilities and other information about such sensors. As will be explained below, the vehicle 102 may include the sensor system 220. The sensor data 219 may relate to one or more sensors of the sensor system 220. As an example, in one or more arrangements, the sensor data 219 may include information on one or more LIDAR sensors 224 of the sensor system 220.

In some instances, at least a portion of the map data 216 and/or the sensor data 219 may be located in one or more data stores 215 located onboard the vehicle 102. Alternatively, or in addition, at least a portion of the map data 216 and/or the sensor data 219 may be located in one or more data stores 215 that are located remotely from the vehicle 102.

As noted above, the vehicle 102 may include the sensor system 220. The sensor system 220 may include one or more sensors. "Sensor" means any device, component and/or system that may detect, and/or sense something. The one or more sensors may be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 220 includes a plurality of sensors, the sensors may work independently from each other. Alternatively, two or more of the sensors may work in combination with each other. In such a case, the two or more sensors may form a sensor network. The sensor system 220 and/or the one or more sensors may be operatively connected to the processor(s) 210, the data store(s) 215, and/or another element of the vehicle 102 (including any of the elements shown in FIG. 2). The sensor system 220 may acquire data of at least a portion of the external environment of the vehicle 102 (e.g., nearby vehicles).

The sensor system 220 may include any suitable type of sensor. Various examples of different types of sensors will be described herein. However, it will be understood that the embodiments are not limited to the particular sensors described. The sensor system 220 may include one or more vehicle sensors 221. The vehicle sensor(s) 221 may detect, determine, and/or sense information about the vehicle 102 itself. In one or more arrangements, the vehicle sensor(s) 221 may be configured to detect, and/or sense position and orientation changes of the vehicle 102, such as, for example, based on inertial acceleration. In one or more arrangements, the vehicle sensor(s) 221 may include one or more accelerometers, one or more gyroscopes, an inertial measurement unit (IMU), a dead-reckoning system, a global navigation satellite system (GNSS), a global positioning system (GPS), a navigation system 247, and/or other suitable sensors. The vehicle sensor(s) 221 may be configured to detect, and/or sense one or more characteristics of the vehicle 102. In one or more arrangements, the vehicle sensor(s) 221 may include a speedometer to determine a current speed of the vehicle 102.

Alternatively, or in addition, the sensor system 220 may include one or more environment sensors 222 configured to acquire, and/or sense driving environment data. "Driving environment data" includes data or information about the external environment in which the vehicle is located or one or more portions thereof. For example, the one or more environment sensors 222 may be configured to detect, quantify and/or sense wind 103 in at least a portion of the external environment of the vehicle 102 and/or the wind force of the wind 103. The one or more environment sensors 222 may be configured to detect, measure, quantify and/or sense other objects in the external environment of the vehicle 102, such as, for example, other vehicles, the slope of the road, the condition of the surface of the road, etc.

Various examples of sensors of the sensor system 220 will be described herein. The example sensors may be part of the one or more environment sensors 222 and/or the one or more vehicle sensors 221. However, it will be understood that the embodiments are not limited to the particular sensors described.

As an example, in one or more arrangements, the sensor system 220 may include one or more radar sensors 223, one or more LIDAR sensors 224, one or more sonar sensors 225, one or more cameras 226, one or more communication sensors 227, and/or one or more anemometers 228. In one or more arrangements, the one or more cameras 226 may be high dynamic range (HDR) cameras or infrared (IR) cameras. The anemometer(s) 228 may include any sensor capable of measuring wind speed. The communication sensor(s) 227 such as radio frequency identification (RFID) and near-field communication (NFC) readers may communicate with other entities using any suitable means of communication such as Wi-Fi, Bluetooth, vehicle-to-infrastructure (V2I) wireless communication, vehicle-to-everything (V2X) wireless communication, RFIC, and NFC.

The vehicle 102 may include an input system 230. An "input system" includes any device, component, system, element or arrangement or groups thereof that enable information/data to be entered into a machine. The input system 230 may receive an input from a vehicle passenger (e.g., a driver or a passenger). The vehicle 102 may include an output system 235. An "output system" includes any device, component, or arrangement or groups thereof that enable information/data to be presented to a vehicle passenger (e.g., a person, a vehicle passenger, etc.) such as a display interface.

The vehicle 102 may include one or more vehicle systems 240. Various examples of the one or more vehicle systems 240 are shown in FIG. 2. However, the vehicle 102 may include more, fewer, or different vehicle systems. It should be appreciated that although particular vehicle systems are separately defined, each or any of the systems or portions thereof may be otherwise combined or segregated via hardware and/or software within the vehicle 102. The vehicle 102 may include a propulsion system 241, a braking system 242, a steering system 243, throttle system 244, a transmission system 245, a signaling system 246, and/or a navigation system 247. Each of these systems may include one or more devices, components, and/or a combination thereof, now known or later developed.

The navigation system 247 may include one or more devices, applications, and/or combinations thereof, now known or later developed, configured to determine the geographic location of the vehicle 102 and/or to determine a travel route for the vehicle 102. The navigation system 247 may include one or more mapping applications to determine a travel route for the vehicle 102. The navigation system 247 may include a global positioning system, a local positioning system or a geolocation system.

The vehicle 102 may include one or more modules, at least some of which are described herein. The modules may be implemented as computer-readable program code that, when executed by a processor 210, implement one or more of the various processes described herein. One or more of the modules may be a component of the processor(s) 210, or one or more of the modules may be executed on and/or distributed among other processing systems to which the processor(s) 210 is operatively connected. The modules may include instructions (e.g., program logic) executable by one or more processor(s) 210. Alternatively, or in addition, one or more data store 215 may contain such instructions.

In one or more arrangements, one or more of the modules described herein may include artificial or computational intelligence elements, e.g., neural network, fuzzy logic or other machine learning algorithms. Further, in one or more arrangements, one or more of the modules may be distributed among a plurality of the modules described herein. In one or more arrangements, two or more of the modules described herein may be combined into a single module.

The vehicle 102 may include one or more autonomous driving modules 260. The autonomous driving module(s) 260 either independently or in combination with the vehicle risk notification system 100 may be configured to determine travel path(s), current autonomous driving maneuvers for the vehicle 102, future autonomous driving maneuvers and/or modifications to current autonomous driving maneuvers based on data acquired by the sensor system 220, driving scene models, and/or data from any other suitable source such as determinations from the sensor data 219. "Driving maneuver" means one or more actions that affect the movement of a vehicle. Examples of driving maneuvers include accelerating, decelerating, braking, turning, moving in a lateral direction of the vehicle 102, changing travel lanes, merging into a travel lane, and/or reversing, just to name a few possibilities. The autonomous driving module(s) 260 may be configured to implement determined driving maneuvers. The autonomous driving module(s) 260 may cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 260 may be configured to execute various vehicle functions and/or to transmit data to, receive data from, interact with, and/or control the vehicle 102 or one or more systems thereof (e.g., one or more of vehicle systems 240).

The processor(s) 210, the vehicle topple risk notification system 100, and/or the autonomous driving module(s) 260 may be operatively connected to communicate with the various vehicle systems 240 and/or individual components thereof. For example, the processor(s) 210, the vehicle topple risk notification system 100, and/or the autonomous driving module(s) 260 may be in communication to send and/or receive information from the various vehicle systems 240 to control the movement, speed, maneuvering, heading, direction, etc. of the vehicle 102. The processor(s) 210, the vehicle topple risk notification system 100, and/or the autonomous driving module(s) 260 may control some or all of these vehicle systems 240 and, thus, may be partially or fully autonomous. The processor(s) 210, the vehicle topple risk notification system 100, and/or the autonomous driving module(s) 260 may cause the vehicle 102 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 102 may include one or more actuators 250. The actuators 250 may be any element or combination of elements operable to modify, adjust and/or alter one or more of the vehicle systems 240 or components thereof to responsive to receiving signals or other inputs from the processor(s) 210 and/or the autonomous driving module(s) 260. Any suitable actuator may be used. For instance, the one or more actuators 250 may include motors, pneumatic actuators, hydraulic pistons, relays, solenoids, and/or piezoelectric actuators, just to name a few possibilities.

It will be appreciated that arrangements described herein may provide numerous benefits, including one or more of the benefits mentioned herein. For example, arrangements described herein may result in reducing the risk of a vehicular collision. The arrangements described herein may also result in traffic decongestion.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above may be realized in hardware or a combination of hardware and software and may be realized in a centralized fashion in one processing system or in a distributed fashion where different elements are spread across several interconnected processing systems. Any kind of processing system or another apparatus adapted for carrying out the methods described herein is suited. A typical combination of hardware and software may be a processing system with computer-usable program code that, when being loaded and executed, controls the processing system such that it carries out the methods described herein. The systems, components and/or processes also may be embedded in a computer-readable storage, such as a computer program product or other data programs storage device, readable by a machine, tangibly embodying a program of instructions executable by the machine to perform methods and processes described herein. These elements also may be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that may contain, or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for generating, from outside a target vehicle, a notification about a risk of the target vehicle toppling over due to wind, the system comprising:
   one or more processors; and
   a memory in communication with the one or more processors, the memory including:
   an environment characteristic determination module including instructions that when executed by the one or more processors cause the one or more processors to determine a wind force of the wind at a location of the target vehicle;
   a vehicle characteristic determination module including instructions that when executed by the one or more processors cause the one or more processors to determine one or more characteristics of the target vehicle;
   a risk determination module including instructions that when executed by the one or more processors cause the one or more processors to:
      determine whether there is a risk of the target vehicle toppling over based on the wind force of the wind and the one or more characteristics of the target vehicle; and
      determine an impact that the toppling of the target vehicle may have on one or more surrounding vehicles;
   and
   a notification module including instructions that when executed by the one or more processors cause the one or more processors to generate a notification about the risk.

2. The system of claim 1, wherein the environment characteristic determination module further includes instructions that when executed by the one or more processors cause the one or more processors to determine a traffic level at the location of the target vehicle; and
   wherein the risk of the target vehicle toppling over is determined based on the traffic level, the wind force of the wind, and the one or more characteristics of the target vehicle.

3. The system of claim 1, wherein the environment characteristic determination module further includes instructions that when executed by the one or more processors cause the one or more processors to determine a road characteristic at the location; and
   wherein the risk of the target vehicle toppling over is determined based on the road characteristic, the wind force of the wind, and the one or more characteristics of the target vehicle.

4. The system of claim 1, wherein the one or more characteristics of the target vehicle include one or more of:
   a weight of the target vehicle,
   a dimension of the target vehicle,
   a center of gravity of the target vehicle, and
   a speed of the target vehicle.

5. The system of claim 1, wherein the risk determination module further includes instructions that when executed by the one or more processors cause the one or more processors to determine an impact of the target vehicle toppling over to an environment around the target vehicle; and
   wherein the notification includes information about the impact of the target vehicle toppling over to an environment around the target vehicle.

6. The system of claim 1, wherein the risk determination module further includes instructions that when executed by the one or more processors cause the one or more processors to determine an impact of the target vehicle toppling over to an environment around the target vehicle; and wherein the memory further includes:
   an impact avoidance module including instructions that when executed by the one or more processors cause the one or more processors to determine an alternate route for a second vehicle to travel so as to avoid the impact of the target vehicle toppling over to an environment around the target vehicle.

7. The system of claim 1, wherein the notification module further includes instructions that when executed by the one or more processors cause the one or more processors to send the notification to at least one of a second vehicle and a server.

8. A method for generating, from outside a target vehicle, a notification about a risk of the target vehicle toppling over due to wind, comprising:
   determining a wind force of the wind at a location of the target vehicle;
   determining one or more characteristics of the target vehicle;
   determining whether there is a risk of the target vehicle toppling over based on the wind force of the wind and the one or more characteristics of the target vehicle;
   determining an impact that the toppling of the target vehicle may have on one or more surrounding vehicles; and
   generating a notification about the risk.

9. The method of claim 8, further comprising:
   determining a traffic level at the location of the target vehicle; and
   wherein the risk of the target vehicle toppling over is determined based on the traffic level, the wind force of the wind, and the one or more characteristics of the target vehicle.

10. The method of claim 8, further comprising:
    determining a road condition at the location of the target vehicle; and
    wherein the risk of the target vehicle toppling over is determined based on the road condition, the wind force of the wind, and the one or more characteristics of the target vehicle.

11. The method of claim 8, wherein the one or more characteristics of the target vehicle include one or more of:
    a weight of the target vehicle,
    a dimension of the target vehicle,
    a center of gravity of the target vehicle, and
    a speed of the target vehicle.

12. The method of claim 8, further comprising:
    determining an impact of the target vehicle toppling over to an environment around the target vehicle; and
    wherein the notification includes information about the impact of the target vehicle toppling over to an environment around the target vehicle.

13. The method of claim 8, further comprising:
    determining an impact of the target vehicle toppling over to an environment around the target vehicle; and
    determining an alternate route for a second vehicle to travel so as to avoid the impact of the target vehicle toppling over to an environment around the target vehicle.

14. The method of claim 8, further comprising:
    sending the notification to at least one of a second vehicle and a server.

15. A non-transitory computer-readable medium for generating, from outside a target vehicle, a notification about a risk of the target vehicle toppling over due to wind and including instructions that when executed by one or more processors cause the one or more processors to:
    determine a wind force of the wind at a location of the target vehicle;
    determine one or more characteristics of the target vehicle;
    determine whether there is a risk of the target vehicle toppling over based on the wind force of the wind and the one or more characteristics of the target vehicle;
    determine an impact that the toppling of the target vehicle may have on one or more surrounding vehicles; and
    generate a notification about the risk.

16. The non-transitory computer-readable medium of claim 15, wherein the instructions further include instructions that when executed by the one or more processors cause the one or more processors to determine a traffic level at the location; and
    wherein the risk of the target vehicle toppling over is determined based on the traffic level at the location, the wind force of the wind, and the one or more characteristics of target vehicle.

17. The non-transitory computer-readable medium of claim 15, wherein the instructions further include instructions that when executed by the one or more processors cause the one or more processors to determine a road characteristic at the location; and
    wherein the risk of the target vehicle toppling over is determined based on the road characteristic at the location, the wind force of the wind, and the one or more characteristics of target vehicle.

18. The non-transitory computer-readable medium of claim 15, wherein the one or more characteristics of the target vehicle include one or more of:
    a weight of the target vehicle,
    a dimension of the target vehicle,
    a center of gravity of the target vehicle, and
    a speed of the target vehicle.

19. The non-transitory computer-readable medium of claim 15, wherein the instructions further include instructions that when executed by the one or more processors cause the one or more processors to determine an impact of the target vehicle toppling over to an environment surrounding the target vehicle; and
    wherein the notification includes information about the impact of the target vehicle toppling over to an environment surrounding the target vehicle.

20. The non-transitory computer-readable medium of claim 15, wherein the instructions further include instructions that when executed by the one or more processors cause the one or more processors to:
    send the notification to at least one of a second vehicle and a server.

* * * * *